United States Patent [19]

Yamamoto et al.

[11] Patent Number: 5,677,493
[45] Date of Patent: Oct. 14, 1997

[54] COMPOSITE CONDITION DETECTION APPARATUS FOR DETECTING STATIC PRESSURE, DIFFERENTIAL PRESSURE AND TEMPERATURE OF A PROCESS

[75] Inventors: Yoshimi Yamamoto, Ibaraki-ken; Tomoyuki Tobita, Katsuta; Akira Nagasu, Ibaraki-ken, all of Japan

[73] Assignee: Hitachi, Ltd., Tokyo, Japan

[21] Appl. No.: 754,467

[22] Filed: Nov. 22, 1996

Related U.S. Application Data

[63] Continuation of Ser. No. 49,205, Apr. 19, 1993, abandoned.

[30] Foreign Application Priority Data

Apr. 23, 1992 [JP] Japan .................................... 4-104261

[51] Int. Cl.$^6$ ................... G01L 9/06; G01L 1/22; G01K 1/08
[52] U.S. Cl. ................... 73/727; 338/4; 374/143
[58] Field of Search ................... 73/708, 720, 721, 73/726, 727; 338/3, 4; 374/143

[56] References Cited

U.S. PATENT DOCUMENTS 5,259,248  11/1993  Ugai et al. ............................. 73/721

Primary Examiner—Richard Chilcot
Assistant Examiner—William L. Oen
Attorney, Agent, or Firm—Kenyon & Kenyon

[57] ABSTRACT

In a multiple function type differential pressure sensor including a semiconductor chip having a differential pressure detector for detecting a differential pressure, temperature detector for detecting a temperature, and static pressure detector for detecting a static pressure provided on a semiconductor substrate of a single chip, two or more pairs of differential pressure detectors means are incorporated, and a difference between outputs of the two or more pairs of differential pressure detectors is fetched out.

13 Claims, 9 Drawing Sheets

| | SENSOR NO.12 | TIME : T2 |
|---|---|---|
| CIRCUITS | DIFFERENTIAL PRESSURE VALUES | ZERO POINT VALUES |
| $\Delta P_1$ | 0.134 | 1.25 |
| $\Delta P_2$ | 0.135 | 1.24 |
| $\Delta P_2$ | 0.092 | 0.98 |

5,677,493

COMPOSITE CONDITION DETECTION APPARATUS FOR DETECTING STATIC PRESSURE, DIFFERENTIAL PRESSURE AND TEMPERATURE OF A PROCESS

This application is a continuation of application Ser. No. 08/049,205, filed 19 Apr. 1993, now abandoned.

BACKGROUND OF THE INVENTION

The present invention relates to process state detector for detecting physical states of a process, and more particularly to a process state detector which is capable of grasping the long term change of sensors for measuring physical states of a process and estimating the lifetimes of the sensors.

In the prior art process state detector for detecting physical states of a process, in order to detect accurately the process state, a main sensor (e.g., a differential pressure sensor) for measuring a specific physical state of a process and compensating sensors (e.g., a static pressure sensor and a temperature sensor) for measuring other physical states are provided on a substrate of a semiconductor sensor. In this connection, prior to the detection of the actual plant data, the relationship between the output characteristics of the main sensor and those of the compensating sensors is previously obtained. Then, when measuring the actual process data, the outputs of the compensating sensors compensate for the output of the main sensor to detect accurately the physical states of the process.

SUMMARY OF THE INVENTION

In the measurement of the physical states of the actual process, the detector is used in the field in which the processing is performed, and the semiconductor sensor of the detector is used in the process situation in which remarkable changes appear. Therefore, as the time goes, changes appear in the characteristics of the main sensor and the compensating sensors which are used to detect the respective physical states of the process. However, the prior art detector does not include means for measuring the long term changes of those sensors, and thus may in some cases obtain the process state using the output of a sensor with characteristics that have been changed over time. Therefore, it is not noticed that the process state obtained on the basis of the output of that sensor is different from the actual process state, and as a result, the process operation may be remarkably hindered in some cases.

The present invention was made in light of the above-mentioned disadvantages of the prior art process state detector, and an object thereof is to provide a process state detector which is capable of detecting the long term change of a semiconductor sensor which becomes a serious problem when detecting the process state.

In order to attain the above-mentioned object, in the process state detector according to the present invention, a first resistor which is sensitive to one physical state of a process, and a second resistor which is sensitive to another physical state of the process are provided in a semiconductor sensor. In this connection, a difference between a resistance value of the first resistor and that of the second resistor, or a difference between the one physical state and the another physical state which were respectively obtained from the first and second resistors is monitored, whereby the long term change of the semiconductor sensor is detected.

Thus, the first and second resistors which serve to detect the respective physical states of the process are provided on the semiconductor sensor, whereby those resistors operate in the same manner to generate the same resistance change in regard to the influences which are given by the outside and include the change of the process state which are the object of the detection.

However, in the case where the long term changes appear in those sensor resistors, their resistance values are changed, or the resistor including the wiring connected thereto is changed in its combined resistance.

Therefore, the difference between the resistance values of the first and second resistors provided on a substrate of the semiconductor sensor, or the difference between the physical states obtained on the basis of their resistance values is detected, whereby it is possible to detect whether or not the long term change occurs in the semiconductor sensor.

DETAILED DESCRIPTION

The preferred embodiments of a process state detector, a semiconductor sensor and a display device for displaying a process state used therefor, according to the present invention, will hereinafter be described in detail with reference to the accompanying drawings.

Figure 1:
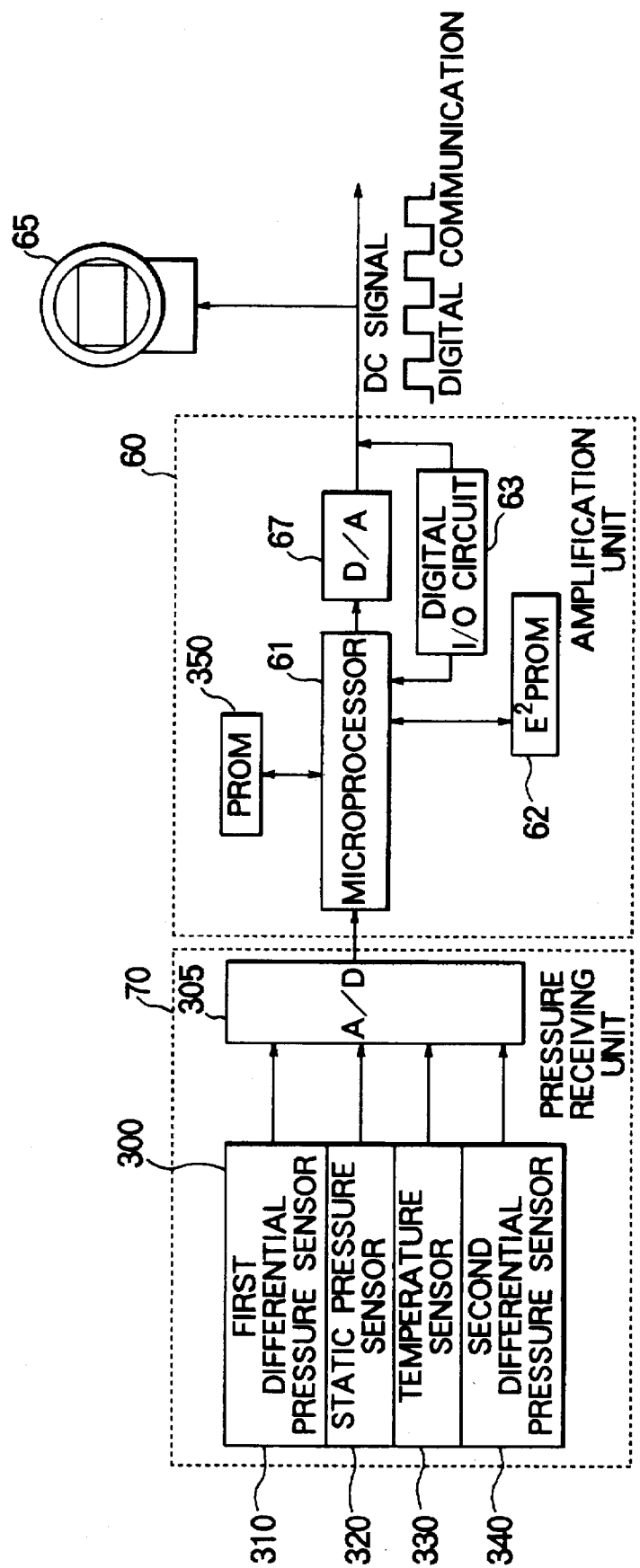
FIG. 1 is a block diagram showing a configuration of a process state detector of an embodiment of the present invention.

FIG. 1 is a block diagram showing the signal processing of a process state detector of an embodiment of the present invention. In the present embodiment, an example is shown in which first and second resistors are provided on a semiconductor substrate and are sensitive to a process state and serve as differential pressure sensors which are sensitive to a differential pressure of the process are provided.

A differential pressure of a process fluid is transmitted to a semiconductor multiple function type sensor 300 which is accommodated in a pressure receiving unit 70. A resistance value of a first differential pressure sensor 310 and that of a second differential pressure sensor 340 are changed depending on the differential pressure. Then, this change is detected as an electric signal which is input to a microprocessor 61 through an A/D converter 305. In the semiconductor multiple function type sensor 300, a static pressure sensor 320 and a temperature sensor 330 are also formed so that a signal relating to a static pressure and a signal relating to a temperature are also input to the microprocessor 61 through the A/D converter 305. The data representing the characteristics relating to the temperature and the static pressure of the two differential pressure sensors is stored in PROM 350 included in the process state detector. The microprocessor 61 corrects the signal from the first differential pressure sensor 310 and that from the second differential pressure sensor 340 using that information, whereby on the basis of those signals from the first and second differential pressure sensors, an output which has excellent temperature/static pressure characteristics can be obtained with accuracy.

Moreover, in the detector of the present embodiment, the information relating to the process state which was obtained by the multiple function type sensor 300 is converted into a DC current (e.g., DC 4 to 20 mA) to be sent to a display unit 65 provided near an amplification unit 60, a digital signal of the information is superimposed on the DC current to be sent to the display unit 65, or a signal (not shown) is sent directly from the amplification unit 60 to the display unit 65, whereby the desired picture can be displayed on the display unit 65. In FIG. 1, the reference numeral 67 denotes a D/A converter.

Further, the digital signal is superimposed on the DC current signal by a digital I/O circuit 63 to perform the communication with a monitoring controller provided on the outside, and the information relating to the process state is displayed by the monitoring controller, whereby the setting and the change of the parameters such as a measuring range, the output adjustment, the I/O monitor, the self-diagnosis, and the like can be performed by the monitoring controller.

Figure 2:
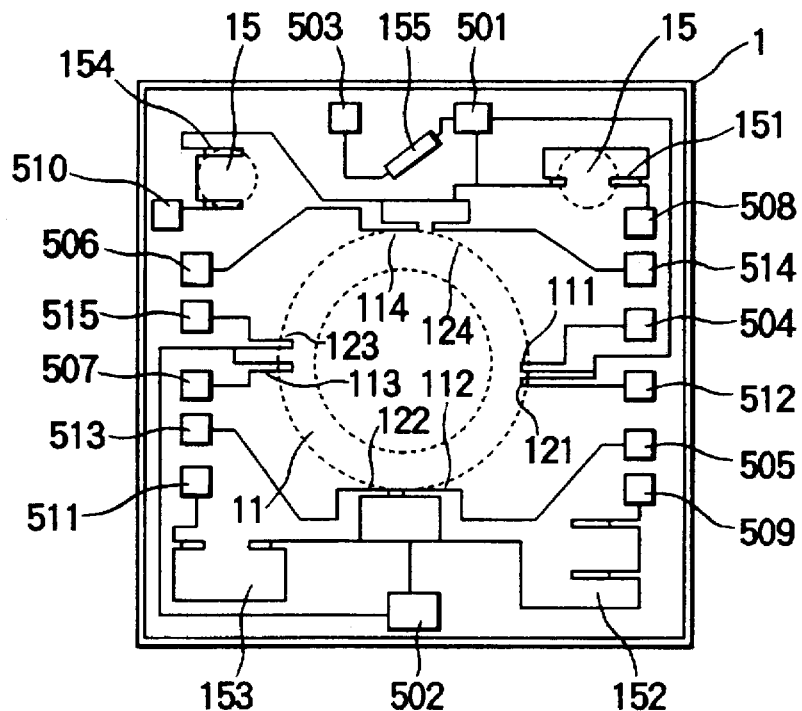
FIG. 2 is a plan view showing an arrangement of a multiple function type sensor of an embodiment of the present invention.
Figure 3:
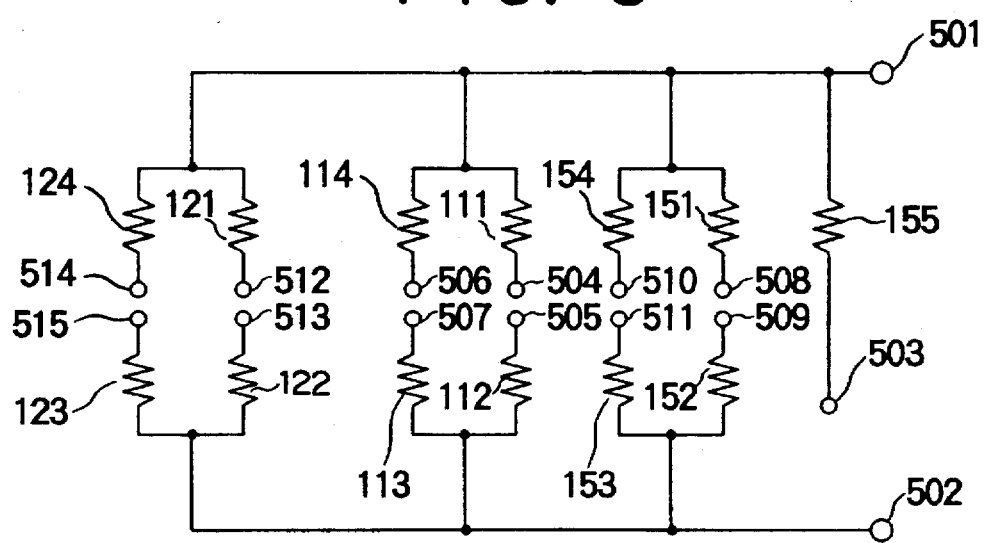
FIG. 3 is a circuit diagram showing a structure of sensor resistance circuits of the sensor shown in FIG. 2.

FIG. 2 is a plan view showing an arrangement of a semiconductor substrate part of the multiple function type differential pressure sensor part used in the present embodiment of the invention. FIG. 3 is a circuit diagram showing a circuit wiring of sensor resistor circuits provided on the semiconductor substrate.

A multiple function type differential pressure sensor chip 1 is made of a (100) oriented n type single crystalline silicon which has a circular thin part 11 about at the center of its one surface. A first process pressure and a second process pressure are respectively applied to the lower and upper surfaces of the substrate, i.e., the both surfaces of the the thin part 11 on the substrate, whereby the thin part 11 becomes a strain producing body which is sensitive to a differential pressure and acts as a pressure sensitive diaphragm for detecting a differential pressure. On the upper surface of the pressure sensitive diaphragm 11, along a <110> axis in the (100) orientation in which the piezoresistance coefficient is the largest, P type resistors (gauge resistors) 111 to 114 as a first differential pressure sensor, and P type resistors (gauge resistors) 121 to 124 as a second differential pressure sensor are formed in a direction parallel to or perpendicular to the crystal axis by the thermal diffusion method or the ion implantation method. The resistors 111 to 114 and the resistors 121 to 124 are arranged near the fixing part in which the radial and tangential strain, which is produced on the differential pressure sensitive diaphragm 11 when applying the differential pressure, is the largest. Moreover, with respect to the arrangement direction of those resistors, the resistors 111 and 121 and the resistors 113 and 123 are arranged radially, and the resistors 112 and 122, and the resistors 114 and 124 are arranged tangentially. In this connection, one ends of each pair of resistors which are arranged in the same direction are connected to each other, and the other ends thereof are connected to respective detection terminals.

Moreover, in a thick part other than the differential pressure sensitive diaphragm, resistors 151 to 154 which are sensitive to the static pressure, and a resistor 155 which is sensitive to the temperature are formed. Those resistors are connected so as to form a bridge circuit as shown in FIG. 3 so that a differential pressure signal having a large amplitude can be obtained. The configuration and the thickness of the differential pressure sensitive diaphragm 11 are set to the desired configuration and thickness in accordance with the differential pressure to which the diaphragm 11 is sensitive. Then, the differential pressure sensitive diaphragm 11 is formed by the anisotropic wet etching technique or the dry etching technique.

Thus, the resistors 111 to 114 and the resistors 121 to 124 on the differential pressure sensitive diaphragm 11 are subjected to the strain which appears in the diaphragm 11 and their resistance values are changed by the piezoresistance effect. Therefore, if the circuit system as shown in FIG. 3 is employed, that change can be fetched in the form of the signals from the terminals 512 to 515 and the terminals 504 to 507.

Figure 4:
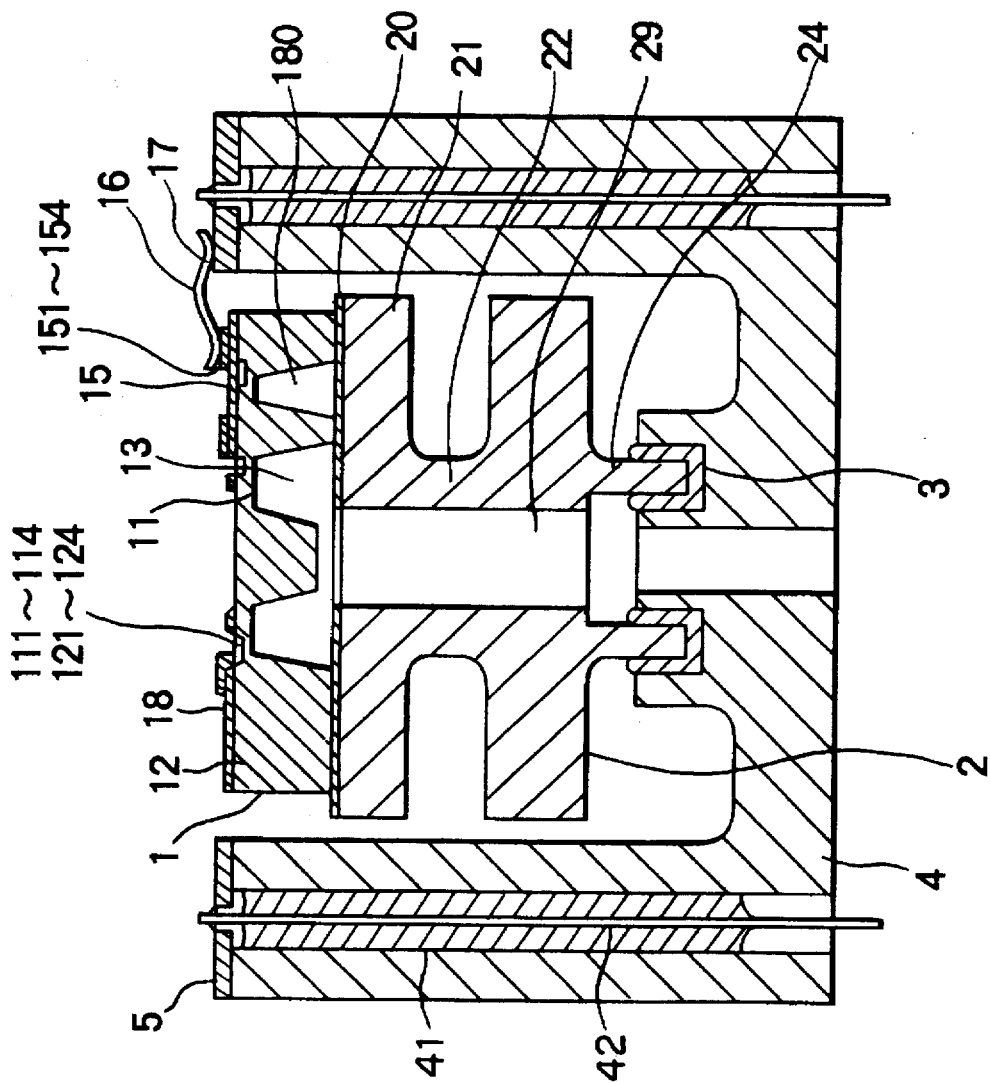
FIG. 4 is a cross sectional view showing a mounting state of an embodiment of the present invention in which the multiple function type sensor shown in FIG. 2 is mounted to a supporting body.

FIG. 4 is a cross sectional view of an embodiment in which the multiple function type sensor used for the process state detector of the present invention is mounted to a supporting body.

The multiple function type differential pressure sensor chip 1 is mounted to a housing 4 through a hollow fixing stage 2. Taking the electrical isolation between the multiple function type differential pressure sensor chip 1 and the housing 4 and the reduction of the thermal strain due to the difference between the coefficient of linear expansion of the sensor chip 1 and that of the housing 4 into consideration, the fixing stage 2 is desirably made of ceramics (e.g., SiC) which has the coefficient of linear expansion near that of silicon. If ceramics are not available, when selecting the material for the fixing stage 2, the difference between the coefficient of linear expansion of the material to be selected and that of silicon may be disregarded. On the side of a bonding surface of the fixing stage 2 confronting with the sensor chip 1, the fixing stage 2 has a bonding layer 20. The bonding layer 20 can be formed in such a way that the bonding surface of the fixing stage 2 is glazed with oxide solder such as low-melting point glass, or metallic solder, an An—Si series alloy layer or an Au thin film is deposited to the bonding surface of the fixing stage 2 by the sputtering method or the vacuum evaporation method. Alternatively, it may also be made of organic or inorganic binder. By providing the bonding layer 20 on the side of the bonding surface of the fixing stage 2 confronting with the sensor chip 1, the sensor chip 1 can be bonded readily to the fixing stage 2 at low temperatures. Moreover, since the bonding layer is thin, the influence of the bonding strain can be reduced as much as possible.

The signals relating to the differential pressure, the static pressure and the temperature are fetched from the multiple function type differential pressure sensor chip 1 to the outside through a lead 17, a wiring board 5, and a terminal 42 of a hermetic sealing part 41 provided in the housing 4.

Now, the resistors 111 to 114 and the resistors 121 to 124 on the differential pressure sensitive diaphragm 11 are subjected to the strain, which is produced by the differential pressure between the upper surface of the diaphragm 11 and a recess part 13 of the sensor chip 1, so that their resistance values are changed by the piezoresistance effect. Therefore, if the circuit system as shown in FIG. 3 is employed, the signal relating to the differential pressure can be fetched from the sensor chip 1 to the outside through the terminals 504 to 507 and the terminal 512 to 515. However, when the pressures applied to the both surfaces of the differential pressure sensitive diaphragm 11 are equal to each other (static pressure state), or when the temperature is changed, the resistors 111 to 114 and the resistors 121 to 124 are also sensitive thereto, so that their outputs are necessarily changed. The former output change is called "the zero-point change due to the static pressure", and the latter output change is called "the zero-point change due to the temperature change". The zero-point change in the temperature change is mainly caused by the dispersion of the resistance values of the resistors 111 to 114 and the resistors 121 to 124, and the resistance values of the resistors as a function of temperature. Therefore, since the relationship between the output of the temperature sensor and the outputs of the differential pressure sensors is readily established, the compensation can be readily performed. On the other hand, the zero-point change in the application of the static pressure is mainly due to the strain which is caused, when applying the static pressure, by the elements such as the fixing stage 2 and the housing 4 other than the sensor chip 1. With respect to this zero-point change as well, in the same manner as that in the zero-point change in the temperature change, if the relationship between the zero-point change of each differential pressure sensor and the output of the static pressure sensor in the application of the static pressure is previously accumulated as the information, the compensation can be performed on the basis of this information. Moreover, when applying the static pressure, in addition to the above-mentioned zero-point change, the sensitivity for the differential pressure is also changed. This change is called "the span change". This cause is as follows. That is, as shown in FIG. 4, normally, the sensor chip 1 has the thick part 12, and is fixedly fastened to the fixing stage 2 and the like through the thick part 12 to be mounted to the housing 4. In this connection, when applying the static pressure, the strain, which is due to the difference in size between the outer diameter and the inner diameter of the thick part 12, is produced in that thick part. This strain is propagated to the above-mentioned differential pressure sensitive diaphragm 11 to change the resistance values of the differential pressure resistors 111 to 114 and 121 to 124. Moreover, this strain reaches 5 to 50% of the maximum strain which is produced in the differential pressure sensitive diaphragm 11 when measuring the differential pressure. Under the state in which such a large strain is produced, when the differential pressure is generated between the both surfaces of the differential pressure sensitive diaphragm 11, the differential pressure sensitive diaphragm 11 is sensitive to this differential pressure to be deformed, so that the resistance values of the differential pressure resistors 111 to 114 and 121 to 124 are largely changed. Since in this deformation process, the above-mentioned uniform and large static pressure strain is applied to the diaphragm 11, the strain distribution of the differential pressure sensitive diaphragm 11 is different from the strain distribution thereof under the atmospheric pressure (static pressure =0). That is, the outputs of the differential pressure sensors under the atmospheric pressure is different from the outputs of the differential pressure sensors under the static pressure. As described above, it is estimated that this output change (span change) may appear even when only the sensor chip 1 is provided. On the other hand, it is estimated that since the above-mentioned zero-point change has the uniform strain distribution, it may not occur. Moreover, in order to mount the sensor chip 1, as shown in FIG. 4, the additional elements such as the fixing stage 2 need to be necessarily provided. As a result, since the differential pressure sensitive diaphragm 11 is influenced by the strain which is due to those additional elements when applying the static pressure, the span change is further increased.

The above-mentioned zero-point change and span change of each differential pressure sensor as the main strain sensor of the multiple function type sensor become serious problems in terms of the measurement of the differential pressure, and in particular, the span change becomes an important problem because the span change is extremely relevant to the accuracy of the measurement of the differential pressure and thus it influences the control accuracy of the plant. Moreover, in the case where the differential pressure sensitive diaphragm 11 is thinned to increase the sensitivity, the span change is correspondingly increased, and therefore, it is impossible to improve readily and accurately the sensitivity for the differential pressure.

To solve the above-mentioned problems, in general, a method is adopted such that the static pressure sensor for sensing the static pressure is provided as an auxiliary sensor on the sensor chip, and the zero-point change and the span change of each differential pressure sensor are compensated positively utilizing the signal from the static pressure sensor. In particular, in the case of the multiple function type sensor which utilizes the difference between the modulus of longitudinal elasticity of the sensor chip 1 and that of the fixing stage 2 in order to obtain the static pressure signal, excessive bending strain is produced in the thick part 12 to obtain the static pressure signal. This bending strain is propagated to the differential pressure sensitive diaphragm 11, and interferes greatly with the outputs of the differential pressure sensors. Therefore, in order to obtain a differential pressure sensor which is excellent in accuracy and has a small zero-point change, it is necessary to clarify the relationship between the input and the output of the differential pressure sensor at each temperature, at each static pressure and at each differential pressure. The amount of information for establishing this input/output relationship is very enormous. Moreover, in the process of obtaining this information, in particular, it is necessary to accumulate the information of the input/output characteristics of the differential pressure sensor while changing the temperature and the static pressure.

The description will hereinbelow be given with respect to a method of producing the input/output characteristic data (hereinafter, referred to as "the data map" for short, when applicable) including the temperature characteristics and the static pressure characteristics used for the first differential pressure sensor 310 and the second differential pressure sensor 340, which are provided in the semiconductor multiple function type sensor 300 of the process state detector as one embodiment of the present invention, with reference to FIG. 5.

Before the semiconductor multiple function type sensor 300 is actually used in the field, the sensor is subjected to an environment in which the temperature, the static pressure and the differential pressure of the environment are suitably changed for the sensor 300, while changing the temperature of the environment from −40° to +120° C., changing the static pressure from 0 to 150 kg/cm$^2$, and changing the differential pressure in the range of ±100,000 mmH$_2$O for the semiconductor multiple function type sensor 300 including the first differential pressure sensor 310, the second differential pressure sensor 340, the static pressure sensor 320 and the temperature sensor 330, and information sent from the sensors is accumulated in a manufacturing line computer 41 through the A/D converter 305.

In the manufacturing line computer 41, on the basis of the information thus accumulated, a first data map 370 based on the output data of the first differential pressure sensor 310, and a second data map 380 based on the output data of the second differential pressure sensor are produced to be written to PROM 350.

Figure 5:
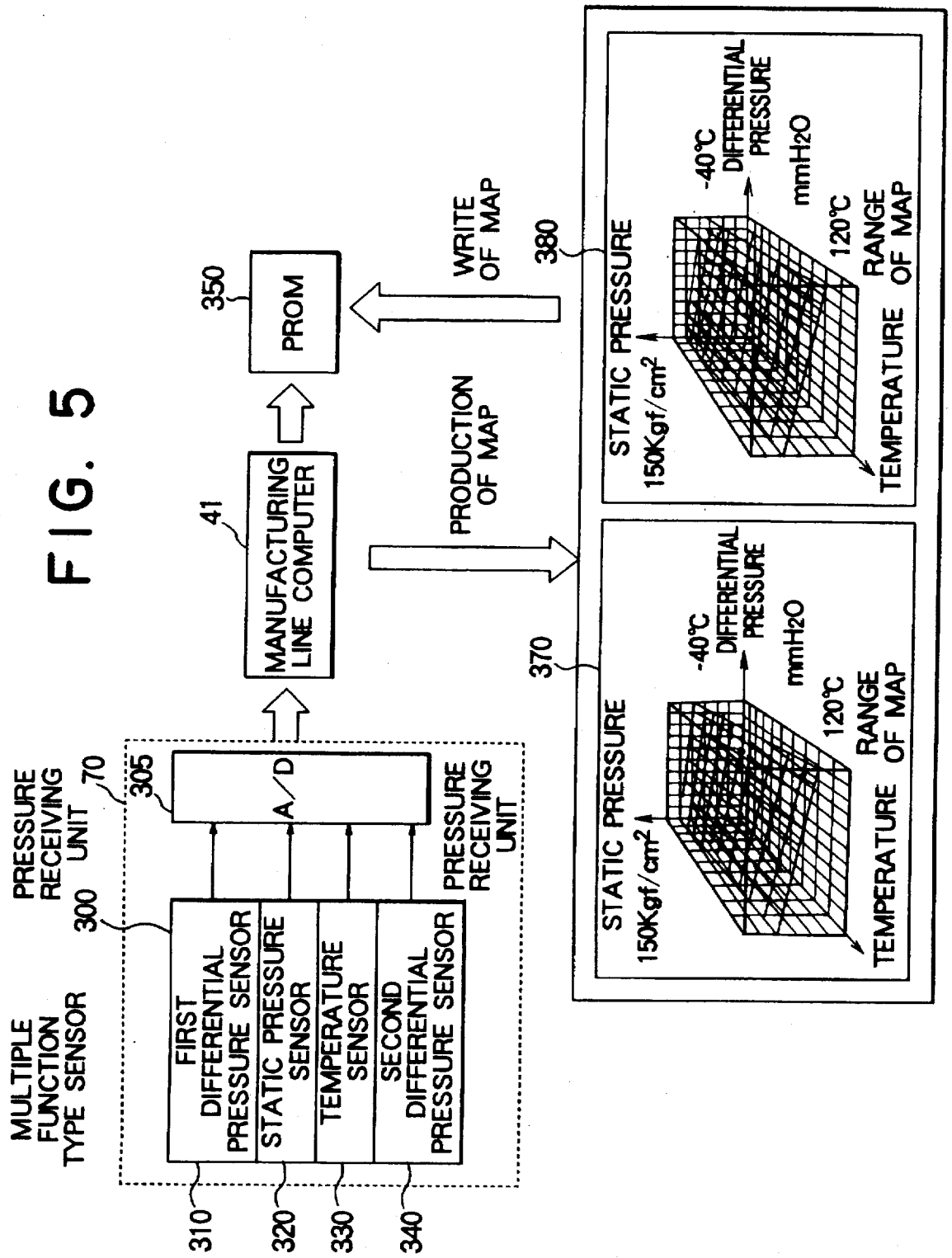
FIG. 5 is a diagram showing a method of producing sensor data maps according to an embodiment of the present invention.

In the data maps 370 and 380 stored in PROM 350, as shown in FIG. 5, the sensor outputs, which were corrected for every temperature and static pressure of the environment in which the sensors 310 and 340 are placed, are accumulated.

Figure 6:
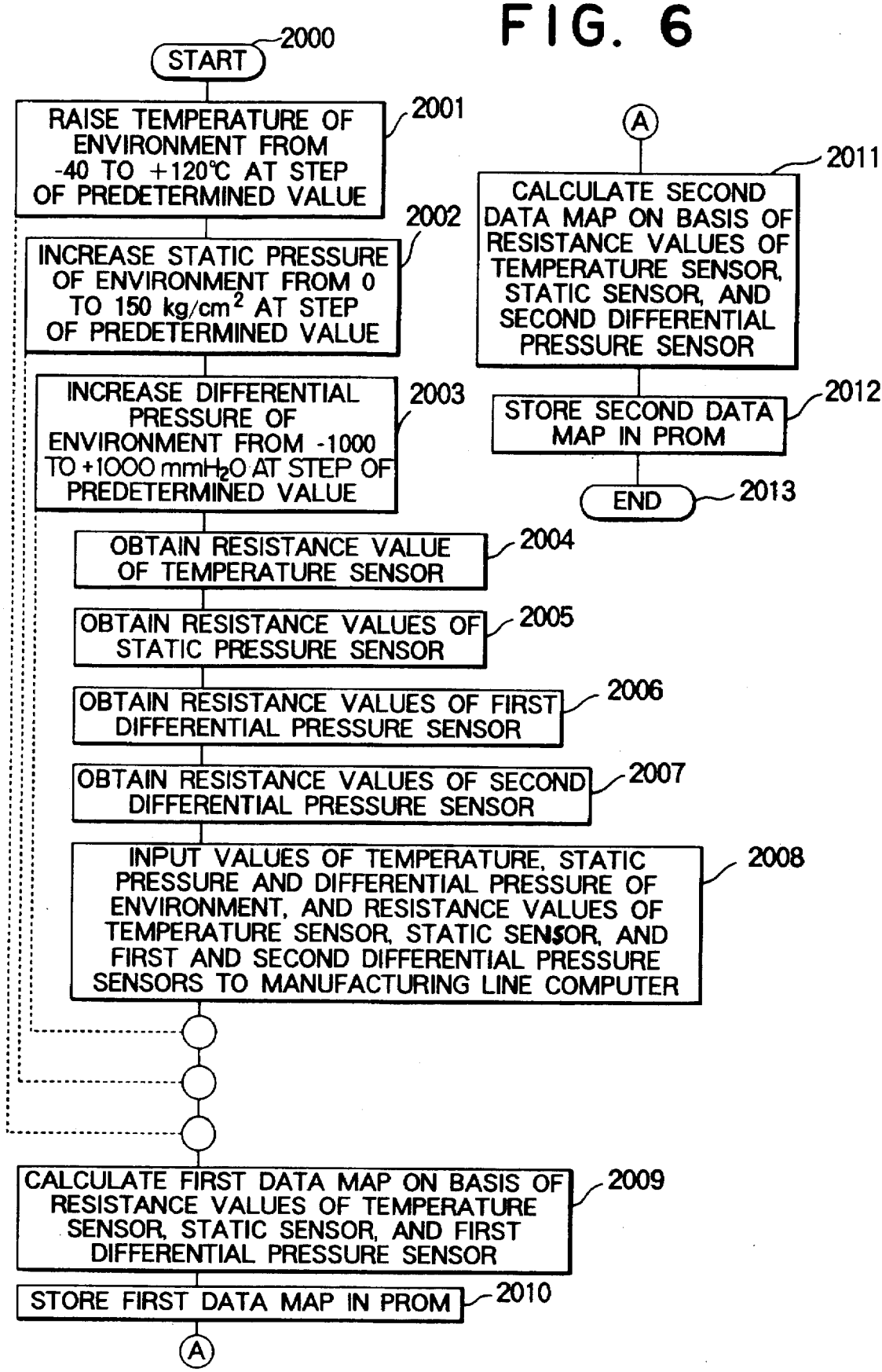
FIG. 6 is a flow chart showing the procedure of producing the sensor data maps.

The detailed processing procedure of producing the data maps shown in FIG. 5 will hereinbelow be described with reference to a flow chart of FIG. 6.

The semiconductor multiple function type sensor 300 is placed under the environment in which the temperature, the static pressure and the differential pressure can be changed (Step 2000).

The temperature of this environment is raised from −40° to +120° C. at a step of a predetermined value (Step 2001).

The static pressure of this environment is increased from 0 to 150 kg/cm$^2$ at a step of a predetermined value (Step 2002).

The differential pressure of this environment is increased from −1,000 to +1,000 mmH$_2$O at a step of a predetermined value (Step 2003).

The resistance value of the temperature sensor is detected (Step 2004).

The resistance values of the static pressure sensor are detected (Step 2005).

The resistance values of the first differential pressure sensor are detected (Step 2006).

The resistance values of the second differential pressure sensor are detected (Step 2007).

The values of the temperature, the static pressure and the differential pressure of the environment, and the resistance values of the temperature sensor, the static pressure sensor, and the first and second differential pressure sensors are input to the manufacturing line computer (Step 2008).

The first data map is calculated on the basis of the resistance values of the temperature sensor, the static pressure sensor, and the first differential pressure sensor (Step 2009).

The first data map is stored in PROM (Step 2010).

The second data map is calculated on the basis of the resistance values of the temperature sensor, the static pressure sensor and the second differential pressure sensor (Step 2011).

The second data map is stored in PROM (Step 2012).

By the production of the first and second data maps, when detecting the actual process state, the differential pressure state of the process can be measured accurately on the basis of the resistance values of the first and second differential pressure sensors 310 and 340.

Figure 7:
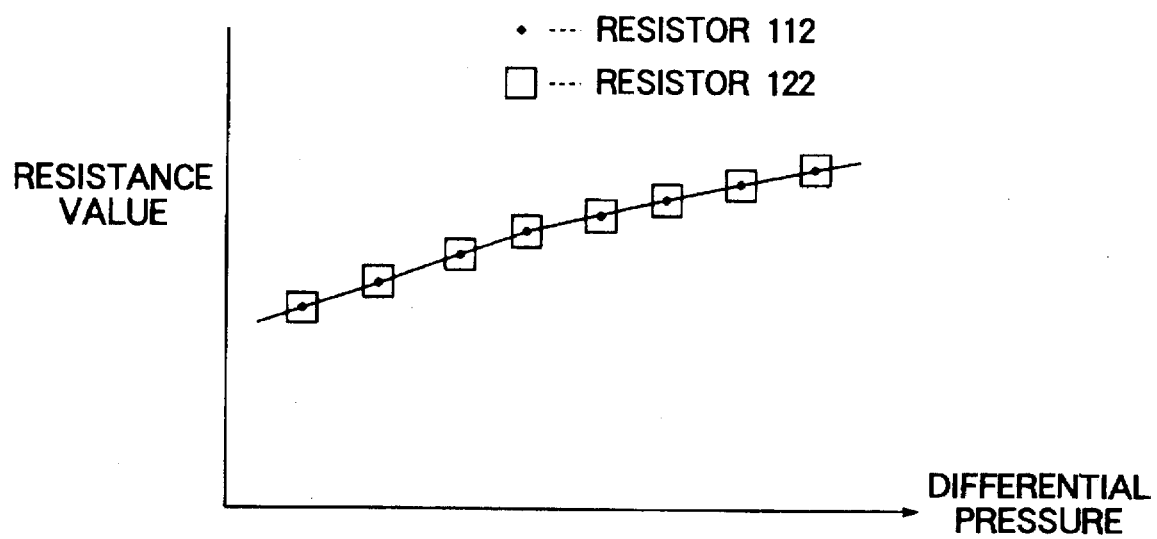
FIG. 7 is a graphical representation useful in explaining the relationship between a differential pressure and resistance values of first and second sensor resistors.

FIG. 7 is a graphical representation showing the relationship between the differential pressure and the outputs, i.e., the resistance values of the differential pressure sensors with respect to the data map of the resistor 112 out of the resistors constituting the first differential pressure sensor shown in FIG. 2 and the data map of the resistor 122 out of the resistors constituting the second differential pressure sensor shown in FIG. 2.

As apparent from the figure, since both the resistors 112 and 122 are located in such positions of the diaphragm 11 as to be subjected to the substantially equal pressure, their resistance values representing the respective differential pressure outputs are approximately equal to each other.

Figure 8:
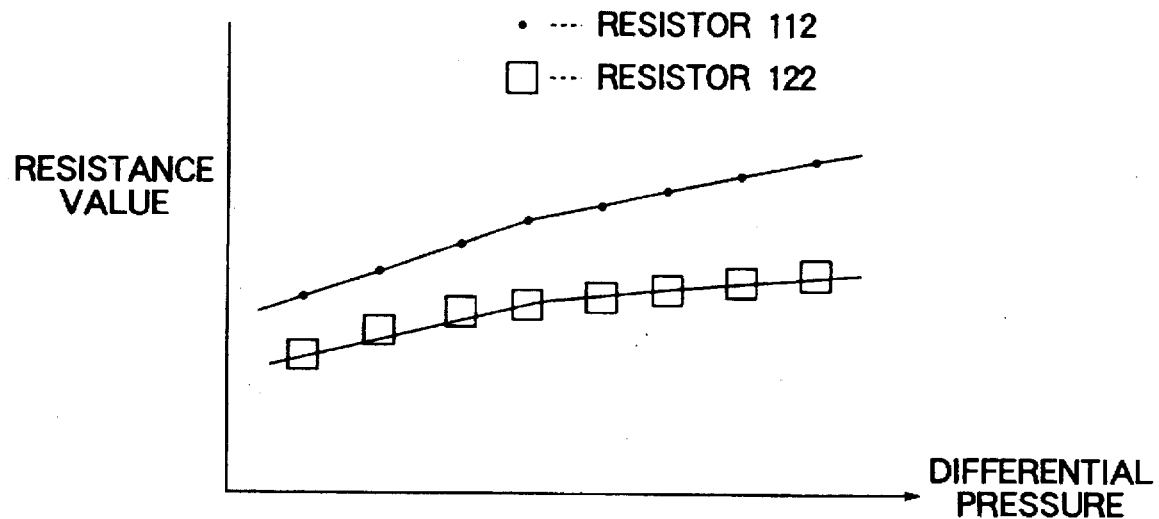
FIG. 8 is a graphical representation useful in explaining the relationship between a differential pressure and resistance values of first and second sensor resistors of another embodiment.

FIG. 8 is a graphical representation showing an example of the relationship between the differential pressure and the resistance values of the differential pressure sensors in the case where the resistors of the first and second differential pressure sensors are not formed in the same positions as those of the resistors 112 and 122 of the embodiment of FIG. 2, but are formed in such positions as not to be subjected to the equal pressure.

As shown in the figure, the resistance values of the two resistors, which represent the respective differential pressure outputs, are not equal to each other. But, the characteristics of the two resistors are input to the manufacturing line computer 41 in the process of producing the data maps, and the characteristics are stored in PROM 350, whereby it is possible to obtain the outputs representing the respective differential pressures equal to each other, when detecting the same process state, on the basis of the outputs of the two resistors.

Moreover, when the resistance value of one of the two resistors is changed due to a long term change, the characteristics of that resistor are changed differently from the characteristics which were previously stored. Therefore, the resistor whose resistance value has changed with the lapse of time can be specified by detecting that change.

Incidentally, the description has been given by taking the resistor 112 and the resistor 122, as the resistors of the first and second differential pressure sensors, by way of example. However, it is to be understood that with respect to other resistors as well, the resistance characteristics as described above can be obtained in advance, and the resistance characteristics of the combined resistances of the circuit (e.g., the combined resistance of the resistors 111, 112, 113 and 114 and the combined resistance of the resistors 121, 122, 123 and 124) can be obtained in advance.

In the process state detector of one embodiment of the present invention, when applying the process pressure, as shown in FIG. 1, by the operation of the microprocessor 61 in the amplification unit 60, the inverse calculation is performed using the outputs of the first differential pressure sensor 310, the temperature sensor 330 and the static pressure sensor 320, and the first data map 370 stored in PROM 350, and as a result, the output signal is highly precise and is excellent in temperature characteristics and static pressure characteristics. At this time, the difference between the outputs of the second differential pressure sensor 340, the temperature sensor 330 and the static pressure sensor 320, and the outputs obtained by the inverse calculation using the second data map 350 stored in PROM 350, the difference between the resistance values of the associated pair of the sensor resistors, (e.g., one difference between the resistance values of the resistors 111 and 121, the resistors 112 and 122, the resistors 113 and 123 or the resistors 114 and 124, or the difference between the resistance values of the resistors 111 and 121, the difference between the resistance values of the resistors 112 and 122, the difference between the resistance values of the resistors 113 and 123, and the difference between the resistance values of the resistors 114 and 124,) in the two pairs of differential pressure sensitive resistance circuits used in the present embodiment and shown in FIG. 3, and the characteristics of the combined resistances of the resistors can be calculated by the microprocessor 61 using the characteristic data stored in PROM 350.

Therefore, when for some reason or other, the characteristics of one sensor are changed due to a long term change, the resistance values or the outputs of the above-mentioned first and second differential pressure sensors 310 and 340 differ from each other. Accordingly, by providing a means for comparing those resistance values, or the outputs with each other, the time series characteristic change of the sensor itself can be grasped.

In the process state detector of an embodiment of the present invention, the outputs of the sensors are stored in $E^2$PROM 62 of the memory unit with the lapse of time. The output data state in $E^2$PROM 62 will hereinbelow be described with reference to FIG. 9.

Figure 9:
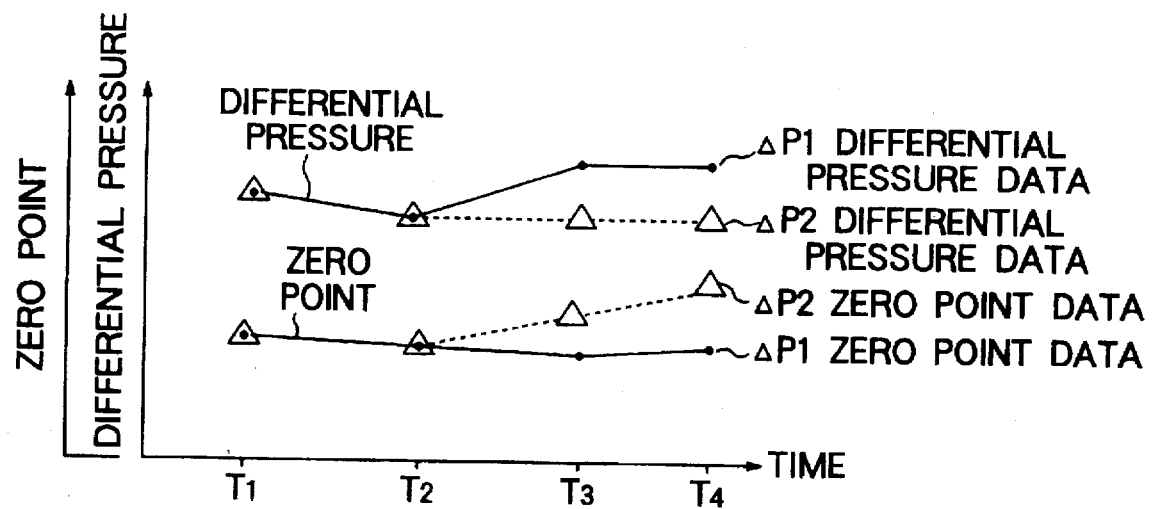
FIG. 9 is a graphical representation useful in explaining the long term changes in a zero point and a differential pressure of the sensor.

As apparent from FIG. 9, with respect to the output difference data of the sensors stored in $E^2$PROM 62, in the data representing the zero points of the first and second differential pressure sensors 310 and 341 as well as in the data representing the differential pressure outputs thereof, at a time T3, the differences come out, and at a time T4, the differences are increased. Therefore, it can be estimated that the drift characteristics of the multiple function type differential pressure sensor 300 are changed by some factors or other. As a result, it is shown that the maintenance is necessary to this process state detector.

Moreover, in the present embodiment, the example is shown in which the output data is stored in the memory unit. However, a method can be adopted such that the output data is displayed on the display device 65, the output data is converted into the digital signal using the digital I/O circuit 63, and the resultant digital signal is superimposed on the DC signal to be output to the external unit.

Moreover, with respect to the data to be sent, not only the output data but also the resistance values of the resistors constituting the sensors and the combined resistance values of the resistors constituting the sensors can be sent.

Figure 10:
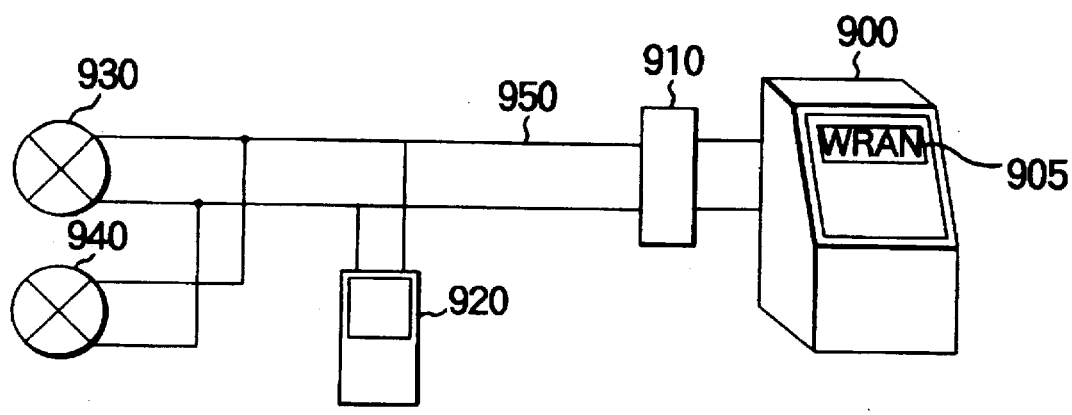
FIG. 10 is a diagram showing a configuration of a system employing the process state detector of the present invention.

FIG. 10 is a schematic diagram showing an embodiment of a process control system in the case where the process state detector of the present invention is connected to a host apparatus for monitoring and controlling the process state.

The long term change states of process state detectors 930 and 940, which are connected to a two-wire transmission line 950, can be monitored even in the position away from the process field by connecting the process state detectors 930 and 940 to an operator's console 900 through a signal comparator 910. Moreover, in addition to the operator's console 900, in a handheld type telecommunication equipment 920 as well, the long term change states of the process state detectors can be detected.

FIGS. 11, 12, 13 and 14 show embodiments of the process control system shown in FIG. 10, in which the long term change of the semiconductor sensor of the process state detector of the present invention is displayed on the operator's console 900.

Figure 11:
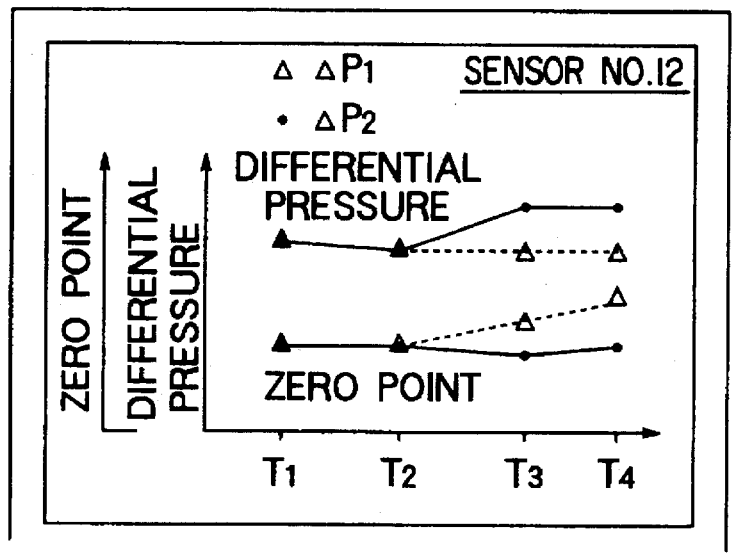
FIG. 11 is a diagram showing an embodiment of the display of the long term changes of the sensor.

FIG. 11 shows an example in which the data representing the differential pressures which were detected by the first and second differential pressure sensors provided on the sensor chip of the process state detector, and the data relating to the zero points are displayed with respect to the lapse of time, and shows that as time goes, the long term change in the differential pressures and the zero points of the sensors are increased.

Figure 12:
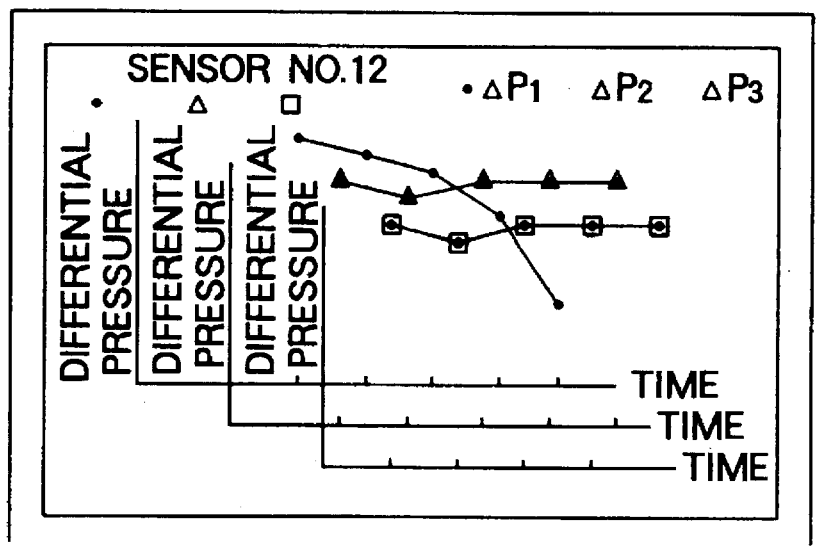
FIG. 12 is a diagram showing another embodiment of the display of the long term changes of the sensor.

FIG. 12 shows the state in which when first, second and third differential pressure sensors are provided in the multiple function type sensor, the data representing the differential pressures of the sensors is changed with the lapse of time. By providing a plurality of sensors in the multiple function type sensor, it is possible to judge the output situations of those sensors under the majority rule by the observer of the process or the programmed control means of the operator's console 900 and to determined readily that the long term change of the specific sensor is increased. In this example, the situation is shown in which the output of the first differential pressure sensor has changed with the lapse of time.

Figures 13, 14:
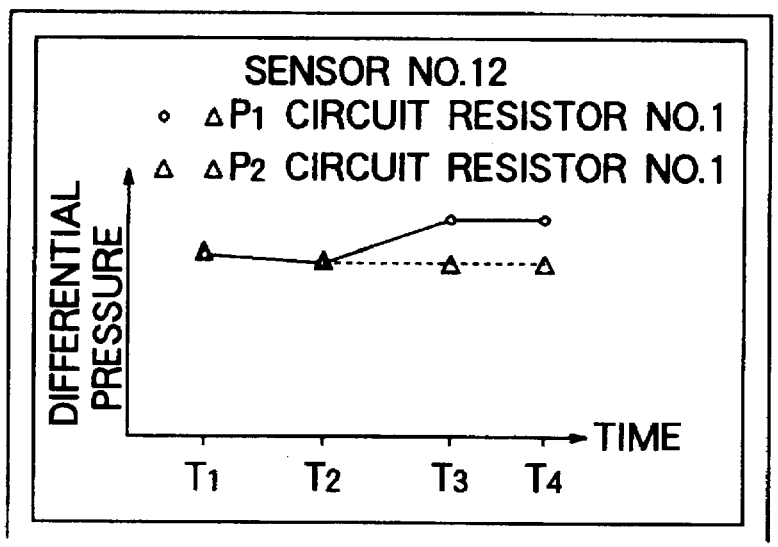
FIG. 13 is a diagram showing still another embodiment of the display of the long term changes of the sensor.
FIG. 14 is a diagram showing yet another embodiment of the display of the long term changes of the sensor.

FIG. 13 shows the output situation, at a certain time point, of the data representing the differential pressure outputs in the case where the first, second and third differential pressure sensors are provided in the multiple function type sensor. On the basis of such a display, it is also possible to grasp the long term changes of the sensors.

FIG. 14 shows an example in which the first and second differential pressure sensors are provided in the multiple function type sensor, the resistance values of the resistors constituting the differential pressure sensor circuits, e.g., the resistors 112 and the resistor 122 are measured, and those values are shown with respect to the lapse of time, and shows that, the long term changes in the resistance values of the resistors are increased with the lapse of time.

Hereinabove, the description has been given with respect to the examples in each of which the long term changes of the sensors of the process state detector are displayed on the operator's console 900. However, the display device for displaying such information is not limited to only the operator's console 900. That is, such information can be displayed on a handheld type display device 920, and a display device can be included in the process state detector 930 itself. Moreover, the data to be displayed on such a display device can be displayed by combining arbitrarily the above-mentioned methods with one another. With respect to the timing when the occurrence of the long term change is displayed, the following methods can be adopted: (1) When monitoring the process state, the programmed control means of the operator's console 900 detects the occurrence of a long term change of a certain sensor to display a warning 905 on the display device as shown in FIG. 10, and the display showing the long term change of that sensor is output in the form of interruption; (2) the observer of the process specifies the specific sensor of the process state detector so that the long term change of that sensor is displayed; and (3) the long term change or changes of the sensor or sensors are displayed on the display device every lapse of a predetermined period of time.

Moreover, in one embodiment of the present invention, the example was shown in which in order to detect the long term change of the differential pressure sensor of the semiconductor multiple function type sensor, a plurality of differential pressure sensitive resistors are provided. However, the present invention is also applicable to an example in which in order to detect the long term changes of the static pressure sensor and the temperature sensor, a plurality of static pressure sensors and a plurality of temperature sensors are provided.

In the case as well where a plurality of sensors are arranged on the semiconductor substrate, the characteristics of those sensors are measured to produce the sensor characteristic data maps, and the long term changes thereof are detected on the basis of the sensor characteristic data maps. Therefore, even in the case where the resistors constituting the sensors are not arranged in the specific positions for detecting the equal process state, the process state detector of the present invention can be constructed.

Further, the programmed microprocessor 61 is included in the process state detector, or the programmed control means is included in the operator's console 900, whereby it is possible to detect the long term changes of the sensors in arbitrary timing and to estimate the lifetimes of the sensors on the basis of the rates of change of the long term changes. In addition, when the long term change of a certain sensor is increased, while outputting the alarm to the outside to press the maintenance, the process state is judged from the sensors other than that sensor, whereby for a period of time until the maintenance is performed, the control can be performed without stopping the processing.

Incidentally, in the embodiment of the present invention, the example was shown in which in order to detect the long term change of the semiconductor sensor included in the process state detector, a plurality of sensor resistors for detecting the process state is provided in the semiconductor sensor, and the output states thereof are compared with each other. However, the present invention is not limited thereto or thereby. That is, another example may also be adopted such that a plurality of semiconductor sensors are provided in the process state detector, and the outputs from those semiconductor sensors are compared with each other, thereby to detect the long term changes of those semiconductor sensors.

As set forth hereinabove, according to the present invention, since it is possible to grasp the long term change of the multiple function type sensor used for the process state detector, the lifetime of the sensor can be estimated, and the number of processes of the maintenance and the management for the process state detector can be greatly reduced.

We claim:

1. A process state detector including a first semiconductor differential pressure sensor having a first set of resistors, said first set of resistors being sensitive to a differential pressure of a process so that their resistances change, said detector comprising:
   a second semiconductor differential pressure sensor having a second set of resistors, said second set of resistors being sensitive to said differential pressure so that their resistances change in the same manner as said first set of resistors; and
   means for monitoring a long-term accuracy of the differential pressure sensors by monitoring said resistances of said first set of resistors and said resistances of said second set of resistors respectively and for comparing the resistances.

2. A detector according to claim 1, wherein said first and second resistors are sensitive to a pressure difference generated in said process.

3. A detector according to claim 1, wherein said first and second resistors are sensitive to a pressure generated in said process.

4. A process state detector including a first semiconductor sensor having a first set of resistors, said first set of resistors being sensitive to a physical state of a process so that their resistances change, said detector comprising:
   a second semiconductor sensor having a second set of resistors, said second set of resistors being sensitive to said physical state of said process so that their resistances change in the same manner as said first set of resistors; and
   means for indicating said physical state of said process as a first value on the basis of said resistances of said first set of resistors, for indicating said physical state of said process as a second value on the basis of a resistances of said second set of resistors, and for monitoring a long term accuracy of the semiconductor sensors by monitoring the difference between said first value of said process defined by said first set of resistors and said second value of said process defined by said second set of resistors.

5. A process state detector including a first semiconductor sensor having a first set of resistors, said first set of resistors being sensitive to a physical state of a process so that their resistances change, said detector comprising:
   a second semiconductor sensor having a second set of resistors, each of said second set of resistors being sensitive to said physical state of said process so that their resistances change in the same manner as said first set of resistors; and
   means for monitoring a long term accuracy of the semiconductor sensors by monitoring said resistances of said first set of resistors and said resistances of said second set of resistors, respectively and for comparing the resistances.

6. A process state detector including a first semiconductor sensor having a first set of resistors, said first set of resistors being sensitive to a physical state of a process so that their resistances change, said detector comprising:
   a second semiconductor sensor having a second set of resistors, each of said second set of resistors being sensitive to said physical state of said process so that their resistances change in the same manner as said first set of resistors; and
   means for obtaining the physical states of said process on the basis of said resistances of said first set of resistors and resistances of said second set of resistors, respectively, and for monitoring a long-term accuracy of the semiconductor sensors by monitoring the physical states of said process detected by said first set of resistors and said second set of resistors.

7. A detector according to claim 6, further comprising means for specifying, when the physical states of said process obtained from said first resistor and said two or more resistors are different from each other, the physical state of said process commanding the majority, out of the plurality of physical states of said process, being accepted as the true physical state of said process.

8. A semiconductor sensor state displaying device in which a physical state of a process is measured by a first semiconductor sensor having a first set of resistors which are sensitive to said physical state so that their resistances change, and said resistances of said first set of resistors is displayed, and said display devise comprising:
   a second semiconductor sensor having a second set of resistors, said second set of sensor resistors being sensitive to said physical state of said process so that their resistances change in the same manner as said first set of resistors;
   means for displaying said resistances of said first set of resistors and resistances of said second set of resistors respectively; and means for monitoring a long-term accuracy of the semiconductor sensors by comparing the resistances.

9. A display device according to claim 8, wherein when said difference between said resistances of said first and second resistors becomes larger than a predetermined limit, said display device displays said difference between said resistances of said first and second resistors.

10. A display device according to claim 8, wherein when said difference between said resistances of said first and second resistors becomes larger than a predetermined limit, said display device outputs a signal.

11. A process state displaying device in which a physical state of a process is measured by a first semiconductor sensor having a first set of resistors which are sensitive to said one physical state so that their resistances change, said physical state of said process is defined as a first value on the basis of said resistances of said first set of resistors, and said physical state thus obtained of said process is displayed, the process state displaying device having a second semiconductor sensor having a second set of resistors being sensitive to said physical state of the process so that their resistances change in the same manner as said first set of resistors said displaying device comprising:

means for defining said physical state of said process as a second value on the basis of said resistances of said second set of resistors, and for displaying a difference between said first value of said process defined by said first set of resistors and said second value of said process defined by said second set of resistors; and means for determining a long-term accuracy of the semiconductor sensors in accordance with said resistances of said first set of resistors and said resistances of said second set of resistors.

12. A process state displaying device in which a physical state of a process is measured by a first semiconductor sensor having a first set of resistors which are sensitive to said physical state so that their resistances change, said physical state of said process is defined as a first value on the basis of said resistances of said first set of resistors, and said first physical state thus defined is displayed, the process state displaying device also having a second semiconductor sensor having a second set of resistors each being sensitive to said physical state of said process so that their resistances change in the same manner as said first set of resistors, said displaying device comprising:

means for defining the physical states of said process as other values on the basis of the resistances of said second set of resistors, respectively;

means for displaying said other values thus defined; and means for determining a long-term accuracy of the semiconductor sensors in accordance with said resistances of said first set of resistors and said resistances of said second set of resistors.

13. A process state detecting system including a process state detector having first process state detecting means for detecting a physical state of a process, comprising:

second process state detecting means, said second process state detecting means serving to detect said physical state of said process in the same manner as said first process state detecting means; and means for comparing a first detection output from said first process state detecting means, and a second detection output from said second process state detecting means with each other to determine a long-term accuracy of the process state detector.

\* \* \* \* \*